(12) United States Patent
Lin et al.

(10) Patent No.: US 10,256,989 B2
(45) Date of Patent: Apr. 9, 2019

(54) APPLICATION METHOD OF A COMMUNICATION TERMINAL AND SMART HOME SYSTEM

(71) Applicant: JRD COMMUNICATION INC., Shenzhen, Guangdong (CN)

(72) Inventors: Jingmao Lin, Guangdong (CN); Dan Li, Guangdong (CN); Dawang Xu, Guangdong (CN); Haizhu Yan, Guangdong (CN)

(73) Assignee: JRD COMMUNICATION (SHENZHEN) LTD., Shenzhen, Guangdong Province (CN)

( * ) Notice: Subject to any disclaimer, the term of this patent is extended or adjusted under 35 U.S.C. 154(b) by 239 days.

(21) Appl. No.: 15/104,229

(22) PCT Filed: Sep. 14, 2015

(86) PCT No.: PCT/CN2015/089540
§ 371 (c)(1),
(2) Date: Jun. 13, 2016

(87) PCT Pub. No.: WO2016/123980
PCT Pub. Date: Aug. 11, 2016

(65) Prior Publication Data
US 2018/0139070 A1    May 17, 2018

(30) Foreign Application Priority Data
Feb. 2, 2015   (CN) .......................... 2015 1 0054341

(51) Int. Cl.
*H04L 29/06* (2006.01)
*H04L 29/08* (2006.01)
(Continued)

(52) U.S. Cl.
CPC .......... *H04L 12/2825* (2013.01); *H04L 12/28* (2013.01); *H04L 12/2807* (2013.01);
(Continued)

(58) Field of Classification Search
CPC .......................... H04L 12/2825; H04L 67/16
(Continued)

(56) References Cited

U.S. PATENT DOCUMENTS

| | | | |
|---|---|---|---|
| 8,456,293 B1 * | 6/2013 | Trundle | G08B 21/0423 340/517 |
| 2001/0051916 A1 | 12/2001 | Shiomi et al. | |

(Continued)

FOREIGN PATENT DOCUMENTS

| | | |
|---|---|---|
| CN | 1463134 A | 12/2003 |
| CN | 101902359 A | 12/2010 |

(Continued)

OTHER PUBLICATIONS

"Household Security System Based on Ultrasonic Sensor Technology with SMS Notification"—Bari Harshal Sunil, R.C. Patel Institute of Technology, May 2014 http://euroessays.org/wp-content/uploads/2014/05/EJAE-175.pdf (Year: 2014).*

(Continued)

*Primary Examiner* — Randy A Scott
(74) *Attorney, Agent, or Firm* — Cheng-Ju Chiang (57) ABSTRACT

An application method of a communication terminal is disclosed, the communication terminal being applied to a smart home system based on IoT protocols. The application method includes: installing, by the communication terminal the IoT protocols, acquiring, by the communication terminal, a first message from a device of the smart home system; and comparing the first message against a preset message comparison table, and, when a match is found, acquiring a second message matching the first message, and further (Continued)

sending the second message by the preset mode. Thus, the communication terminal according to the disclosure can connect to the appliances of the smart home system based on IoT protocols, enabling the smart home system relying on the communication terminal, which can provide realtime information reporting. In addition, the smart home system provides a low cost, a wide coverage area and a high intelligence.

17 Claims, 6 Drawing Sheets

(51) Int. Cl.
    *H04L 12/28*     (2006.01)
    *G08B 25/00*     (2006.01)

(52) U.S. Cl.
    CPC ...... *H04L 12/2814* (2013.01); *H04L 12/2827* (2013.01); *G08B 25/00* (2013.01); *H04L 67/125* (2013.01)

(58) Field of Classification Search
    USPC .......................... 709/204, 213, 217, 223, 227
    See application file for complete search history.

(56) References Cited

U.S. PATENT DOCUMENTS

| | | | |
|---|---|---|---|
| 2011/0102133 A1* | 5/2011 | Shaffer | G08B 1/08 340/5.1 |
| 2014/0052775 A1 | 2/2014 | Koo | |
| 2014/0087697 A1* | 3/2014 | Johnston | H04W 4/12 455/412.1 |
| 2014/0207916 A1 | 7/2014 | Li et al. | |
| 2016/0072670 A1* | 3/2016 | Matthieu | H04L 67/12 709/204 |

FOREIGN PATENT DOCUMENTS

| | | |
|---|---|---|
| CN | 102073308 A | 5/2011 |
| CN | 103152503 A | 6/2013 |
| CN | 103901844 A | 7/2014 |
| CN | 104202222 A | 12/2014 |
| CN | 104683193 A | 6/2015 |
| EP | 2597814 A1 | 5/2013 |

OTHER PUBLICATIONS

International Search Report on related PCT application (PCT/CN2015/089540) from International Searching Authority (CN) dated Dec. 23, 2015.

* cited by examiner

| OS Platform | Data Package | Version | Information |
|---|---|---|---|
| Resource | alljoyn-14.12.00-src.tar.gz | 14.12.00 | Version Description |
| | ajtcl-14.12.00-src.tar.gz | 14.12.00 | Version Description |
| Andriod System | Core SDK-release | 14.12.00 | Version Description |
| | Core-SDK-debug | 14.12.00 | Version Description |
| Apple System | Core SDK | 14.12.00 | Version Description |
| Windows System | Windows SDK(64-bit) | 14.12.00 | Version Description |
| | Windows Thin Core SDK | 14.12.00 | Version Description |
| ... | ... | ... | ... |

FIG. 4

| Application Layer | |
|---|---|
| AllJoyn Service Framework | |
| Onboarding \| Control Panel \| Notification \| Audio \| Characteristics | ... |
| AllJoyn Core Framework \| AllJoyn Thin Client | ... |
| Device Discovery \| Security \| Connection Management \| Network Management | |
| Operating System | ... |
| Physical Layer (Wi-Fi, programmable logic controller, Ethernet, Bluetooth) | ... |

Message Comparison Table

| No. | Keywords | Voice Files | Alarm Modes |
|---|---|---|---|
| 1 | Video Surveillance Alarm | /Command/Illegal Break In.wav | Arming Mode |
| 2 | Smoke Alarm | /Command/Fire Alarm.mp3 | Security Mode |
| 3 | Door Lock Alarm | /Command/Door lock is illegally opened.mp3 | Arming Mode |
| 4 | ... | ... | ... |

FIG. 8

Preset Number Table

| Dialing Sequence | Phone Number | Dialing Times | To send a message to? |
|---|---|---|---|
| 1 | 136***** | 3 | Y |
| 2 | 151***** | 2 | Y |
| 3 | 0755-66*** | 1 | N |
| 4 | 110 | 1 | N |
| 5 | ... | ... | |

APPLICATION METHOD OF A COMMUNICATION TERMINAL AND SMART HOME SYSTEM

FIELD OF THE DISCLOSURE

The present disclosure relates to smart home control, and more particularly, to an application method of a communication terminal and a smart home system.

BACKGROUND OF THE DISCLOSURE

With the rise of internet of things (IoT) and smart home, the home appliances are becoming smarter and smarter, making people's home environment increasingly intelligent.

In traditional home control systems, the home appliances report information by transmitting data packets. Such data communication solution is subject to the network conditions at both ends and is vulnerable to interferences, typically resulting in a low transmission speed. The poor realtime capability would often disable some users from viewing the information in time, such that the smart home system cannot be controlled in real time, which may even cause severe consequences due to the inability of realtime control.

SUMMARY OF THE DISCLOSURE

The present disclosure provides an application method based on a communication terminal, in which the communication terminal connects to and communicates with smart home system devices based on internet of things (IoT) protocols, thus providing the user with realtime information of the smart home system devices.

To achieve the above objective, an application method of a communication terminal is provided according to an aspect of the disclosure, where the communication terminal is applied to a smart home system based on IoT protocols. The application method includes: installing, by the communication terminal, the IoT protocols, which may refer to AllJoyn application protocols, specifically, the communication terminal may acquire an AllJoyn software development kit (SDK) to install the AllJoyn application protocols; acquiring, by the communication terminal, a first message from a device of the smart home system, specifically, the communication terminal may establish a connection with the device to acquire the first message from the device, and the device may be an AllJoyn device; comparing the first message against a preset message comparison table, and, when a match is found, acquiring a second message matching the first message, specifically, a keyword may be extracted from the first message and compared against the message comparison table, and the second message matching the first message can be acquired; and transmitting the second message by a preset mode.

The transmitting the second message by the preset mode may include: acquiring an alarm mode corresponding to the second message based on the keyword; and transmitting the second message in accordance with the alarm mode.

The transmitting the second message in accordance with the alarm mode may include: transmitting the second message to preset numbers by way of short text message; and/or dialing the preset numbers to transmit the second message by way of voice.

The dialing the preset numbers may include: dialing the preset numbers until answered; or, dialing all the preset numbers until answered.

An application method of a communication terminal is further provided according to another aspect of the disclosure, wherein the communication terminal is applied to a smart home system based on internet of things (IoT) protocols. The application method includes: installing the IoT protocols; acquiring a first message from a device of the smart home system; comparing the first message against a preset message comparison table, and, when a match is found, acquiring a second message matching the first message; and further transmitting the second message by a preset mode.

The IoT protocols may be AllJoyn application protocols, and the communication terminal installing the IoT protocols may include: acquiring, by the communication terminal, an AllJoyn software development kit (SDK) to install the AllJoyn application protocols. The communication terminal acquiring the first message from the device of the smart home system may include: establishing, by the communication terminal, a connection with the device to acquire the first message. The device may be an AllJoyn device.

The comparing the first message against the preset message comparison table for a match may include: extracting a keyword from the first message, comparing the keyword against the message comparison table, and, when a match is found, acquiring the second message matching the first message from the message comparison table.

The transmitting the second message by the preset mode may include: acquiring an alarm mode corresponding to the second message based on the keyword; and transmitting the second message in accordance with the alarm mode.

The transmitting the second message in accordance with the alarm mode may include: transmitting the second message to preset numbers by way of short text message; and/or dialing the preset numbers to transmit the second message by way of voice.

The dialing the preset numbers may include: dialing the preset numbers until answered; or, dialing all the preset numbers until answered.

The disclosure further provides a smart home system including the above communication terminal, which is applied to the smart home system based on internet of things (IoT) protocols. The communication terminal may include a processing module configured to install IoT protocols, and a communication module connected to the processing module and configured to acquire a first message from a device of the smart home system. When the first message is acquired, the processing module may compare the first message against a preset message comparison table, and may, when a match is found, acquire a second message matching the first message. The communication terminal then transmits the second message by a preset mode.

The IoT protocols may be AllJoyn application protocols. Specifically, the communication module may acquire an AllJoyn software development kit (SDK), the processing module may install the AllJoyn SDK to implant the AllJoyn application protocols, and the communication module may establish a connection with the device to acquire the first message from the device, which is an AllJoyn device.

The communication terminal may further include a storage module connected to the processing module and configured to store the message comparison table. The processing module may extract a keyword from the first message, compare the keyword against the message comparison table, and, when a match is found, acquire the second message matching the first message from the message comparison table.

The storage module may further contain alarm modes corresponding to the message comparison table. The processing module may acquire the alarm mode corresponding to the second message according to the keyword, and the communication module may transmit the second message in accordance with the alarm mode.

Advantages of the disclosure may follow: differing from the prior art, the communication terminal is applied to the smart home system based on IoT protocols, it is installed with IoT protocols, acquires a first message from a smart home system device, compares the first message against a preset message comparison table, and, when a match is found, acquires a second message matching the first message, and further transmits the second message by a preset mode. Thus, based on IoT protocols, the communication terminal can connect to and communicate with the devices of the smart home system, and can thus report, remotely and in real time, the messages, acquired from the devices in the smart home system, to the user by the preset mode. Therefore, the user can be informed of the realtime information of the home system. In addition, the smart home system relying on this communication terminal provides a low cost, a wide coverage area and a high intelligence.

DETAILED DESCRIPTION OF THE DISCLOSURE

To render the technical issues to be solved, technical solutions and advantages of the disclosure more easily understood, the disclosure will be described in further detail with reference to the accompanying drawings and embodiments. Note, the specific embodiments described are meant to illustrate, but not to limit the disclosure.

Figure 1:
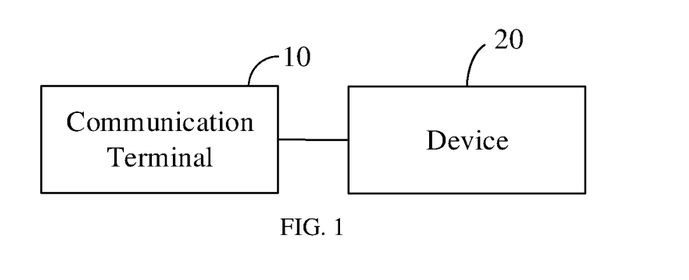
FIG. 1 is a block diagram of a smart home system according to a first embodiment of the disclosure.

Referring to FIG. 1, a block diagram of a smart home system according to a first embodiment is shown. The smart home system includes a communication terminal 10 and a device 20 connected to the communication terminal 10.

Both the communication terminal 10 and the device 20 are installed with internet of things (IoT) protocols. The communication terminal 10 may acquire a first message from the device 20, and compare it against a preset message comparison table for a match. The communication terminal 10 may then acquire a second message matching the first message, and transmit the second message by a preset mode.

Based on IoT protocols, the communication terminal 10 can connect to and communicate with the device 20, and can report, remotely and in real time, the message acquired from the device 20 to a user by the preset mode. Thus, the user can learn the realtime information of the smart home system. In addition, the smart home system relying on this communication terminal provides a low cost, a wide coverage area and a high intelligence.

Figure 2:
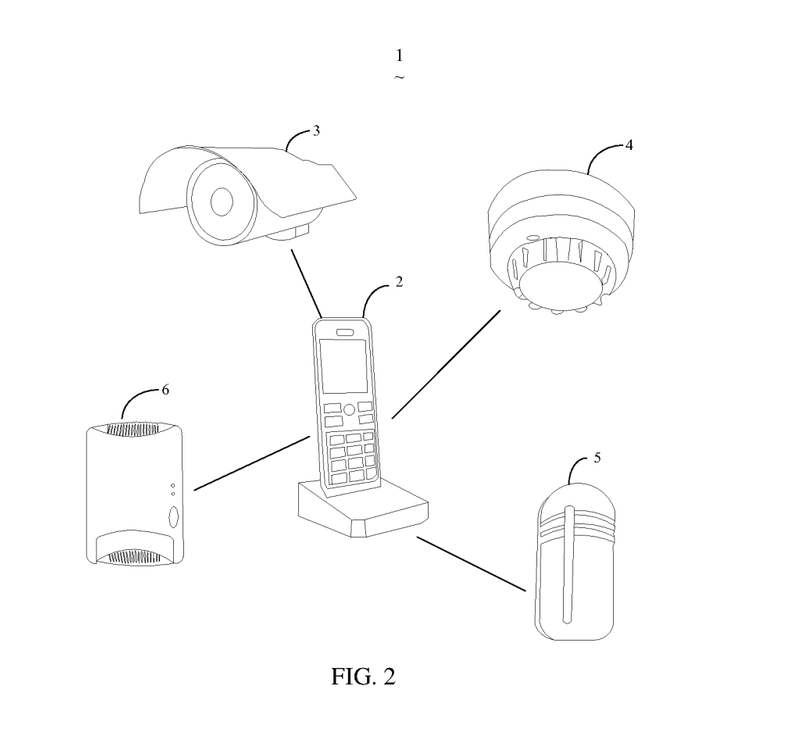
FIG. 2 is a schematic diagram of a smart home system according to a second embodiment of the disclosure.

As IoT continues to evolve, electrical equipment is becoming increasingly smarter, and people are pursuing for more intelligent home environment. Relying on the monitoring of various connected home appliances, the user can learn and effectively control the home environment. AllJoyn (all to join in the fun) is a system that provides a universal software framework and core set of system services that enable interoperability among connected products and software applications across manufacturers to create dynamic proximal networks. Under AllJoyn application protocols, all AllJoyn devices are equal and can be connected to each other without the need of a server. Referring now to FIG. 2, a schematic diagram of a smart home system according to a second embodiment is shown. The core of the smart home system is a communication terminal integrated with internet of everything (IoE) capabilities based on AllJoyn open protocols. The communication terminal plays a central role in the smart home system. The communication terminal can connect to and thus communicate with other smart home AllJoyn devices, and can provide and report the realtime information of the AllJoyn devices to a remote user. As is shown in FIG. 2, the smart home system 1 includes a communication terminal 2 and multiple AllJoyn devices connected to the communication terminal 2, where the AllJoyn devices refer to the home appliances working with the AllJoyn application protocols. In this embodiment, the smart home system is enabled with fireproof, burglar proof and gas leakage proof. The home telephone, as a basic home communication device, has existed in people's homes for nearly one and a half centuries. Compared with other home appliances, the home telephone has higher occupancy in homes worldwide. In addition, other home appliances do not have the instantaneous communication capability of the home telephone. Therefore, in this embodiment the communication terminal 2 is implemented as a smart home telephone. By intelligentizing the home telephone and using it to create an IoT with other home appliances, the smart home telephone can provide and report the realtime information to the remote user, bringing better realtime experience.

The AllJoyn devices may include a video surveillance camera 3, a smoke detector 4, a burglar alarm 5 and a gas leak alarm 6. The smart home telephone may connect to and communicate with the above AllJoyn devices, and thus acquire and send their data messages to the remote user in real time. For example, when an AllJoyn device produces an alarm message, the smart home telephone will immediately dial the preset user number to notify the user to take timely measures; if the user does not answer the call in time, the smart home telephone will give an alarm to the monitoring center, such that immediate measures can be taken, preventing the occurrence of severe consequences due to the alarm message not being handled in time. In other embodiments, the AllJoyn devices may also include refrigerators, washing machines, water heaters, lights, televisions and other everyday household appliances. The user can utilize the communication terminal 2 for remote control of the turning on and off of these appliances, or for remote control of other functions. In addition, the communication terminal 2 can be connected to external service facilities, for example, to a community service facility, such that the communication terminal 12 can acquire the readings of smart electric meters, water meters and gas meters, thus the user can learn the current usage of water, electricity and gas. For example, when the supply of water or electricity is cut off, the community service facility can notify the user via the communication terminal 2.

Figure 3:
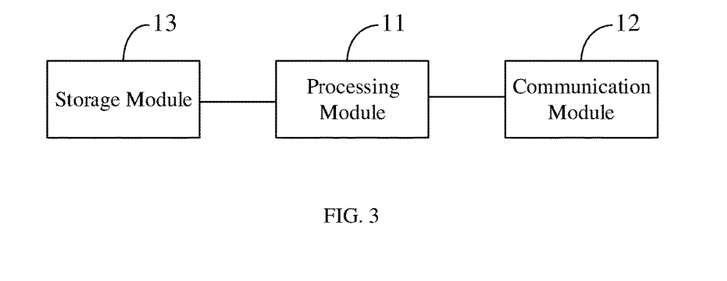
FIG. 3 is a block diagram of a communication terminal according to the second embodiment of the disclosure.

Referring now to FIG. 3, a block diagram of a communication terminal according to the second embodiment is shown. This communication terminal 2 can be applied to the smart home system 1 as illustrated in FIG. 2. The communication terminal 2 is based on AllJoyn application protocols and has IoE capabilities. The communication terminal 2 includes a processing module 11 installed with IoT protocols, a communication module 12 and a storage module 13. The processing module 11 is connected to the communication module 12 and the storage module 13, respectively. To implant the IoT protocols into the communication terminal 2, the user can directly download and install the AllJoyn software development kit (SDK) from the Allseen official website; or, he can download the AllJoyn SDK from the Allseen official website using the communication module 12, and then install the AllJoyn SDK into the processing module 11. As a result, the communication terminal 2 would be installed with AllJoyn application protocols. The communication module 12 may be connected to devices of the smart home system 1, where the devices may refer to AllJoyn devices, which use the AllJoyn application protocols and have equal interconnection and intercommunication status as the communication terminal 2 under the AllJoyn application protocols. The communication module 12 may acquire a first message from an AllJoyn device. The processing module 11 may then compare the first message against a preset message comparison table for a match, and thus acquire a second message matching the first message. In particular, the message comparison table is stored in the storage module 13, and the processing module 11 may extract a keyword from the first message and compare the keyword against the message comparison table; when a match is found in the table, the processing module 11 will retrieve from the table the second message matching the first message, and the communication module 12 may transmit the second message by a preset mode. In addition, the storage module 13 may further contain alarm modes corresponding to the message comparison table, thus the processing module 11 may retrieve the alarm mode corresponding to the second message based on the keyword, and further control the communication module 12 to transmit the second message in accordance with the alarm mode.

Figure 4:
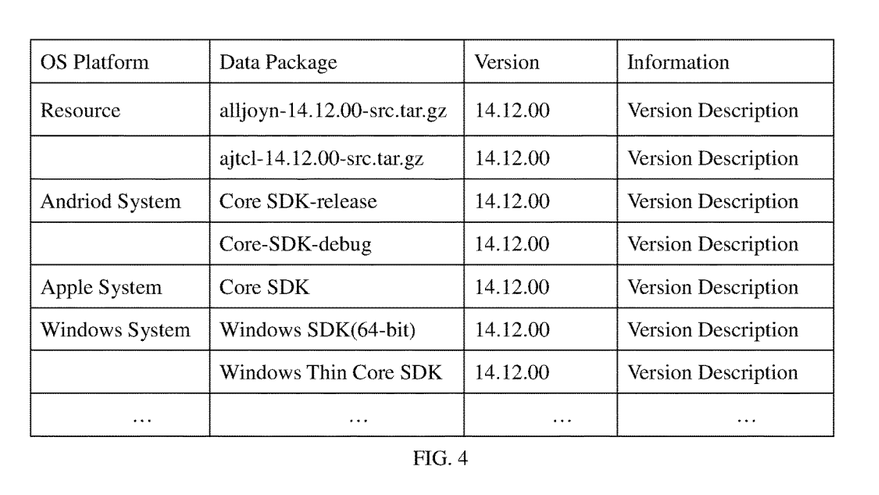
FIG. 4 shows a source list of software development kits (SDK) of different operating systems (OS).
Figure 5:
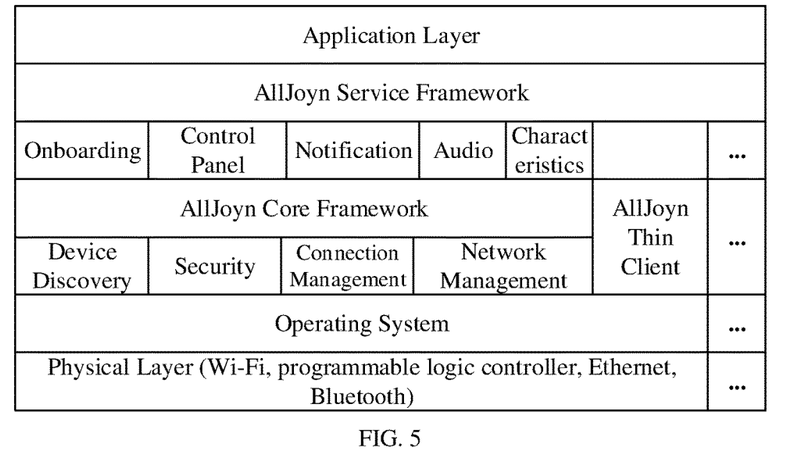
FIG. 5 illustrates code transplantation on the communication terminal according to the second embodiment of the disclosure.
Figure 6:
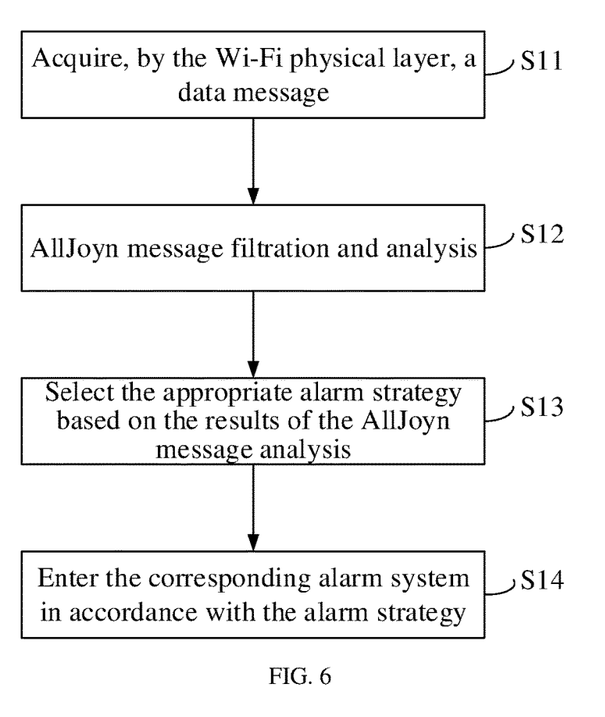
FIG. 6 is a flow chart illustrating the message reporting of the communication terminal using AllJoyn protocols.

As mentioned above, the communication terminal 2 is enabled by installing the AllJoyn SDK into a conventional home telephone, which thus will have AllJoyn application features, including onboarding, notification and control panel. AllJoyn can support different operating systems (OS), while the current home telephone can use various OSes. Different OSes may have different SDKs, referring to FIG. 4 for the SDK source list, thus, the appropriate SDK can be selected in accordance with the operating system supported by the home telephone. Common OSes may at least include Android system. Furthermore, the home telephone may perform code transplantation in accordance with the AllJoyn software architecture, referring to FIG. 5 where a schematic diagram of code transplantation is shown. As a result, the conventional home telephone serves as the communication terminal 2 of the current embodiment. FIG. 6 shows a flow chart illustrating the message reporting of the smart home telephone using AllJoyn protocols, the reporting flow including the following steps. In a first step S11, the Wi-Fi physical layer acquires a data message. The following step S12 includes the AllJoyn message filteration and analysis. In the following step S13, a corresponding alert strategy is selected based on the results of the AllJoyn message analysis. In the final step S14, a corresponding alarm system, for example, the dial system and/or the short text message system, will be entered according to the alert command.

In conclusion, the smart home system 1, relying on the communication terminal 2, can provide realtime information for the remote user. In addition, the smart home system 1 is based on AllJoyn application protocols, providing a solution with low cost, wide coverage area and high intelligence. Thus, the user can learn the home information whenever and wherever, and can timely handle home emergencies when they occur.

Figure 7:
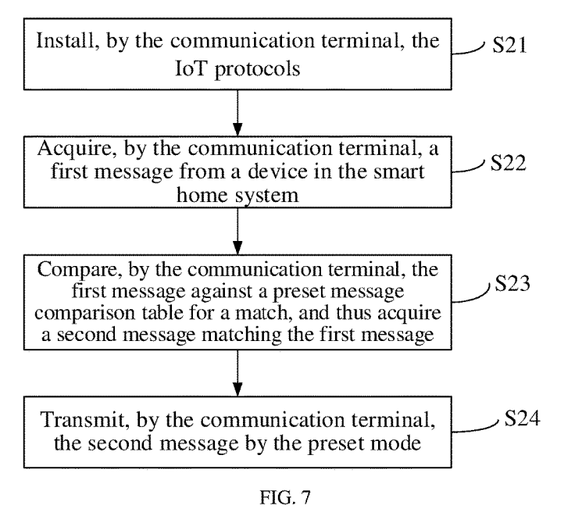
FIG. 7 is a flow chart illustrating a first embodiment of an application method of a communication terminal according to the disclosure.

Referring now to FIG. 7 and also to FIG. 2. FIG. 7 is a flow chart illustrating an application method of a communication terminal according to an embodiment. The application method is based on the smart home system 1 using AllJoyn application protocols, as is shown in FIG. 2. The application method includes the following steps.

In a first step S21, the communication terminal 2 is installed with IoT protocols.

Typically, the IoT protocols are AllJoyn application protocols. The communication terminal 2 may acquire an AllJoyn SDK and install it into its processing module 11, such that the communication terminal 2 would be enabled with with AllJoyn application features. The AllJoyn SDK can be downloaded from the Allseen official website, or can also be implanted into the communication terminal 2 when developing the communication terminal 2. The communication terminal 2 can be a wireless fixed-line home telephone, or a wired fixed-line home telephone. The method may proceed to step S22.

In the following step S22, the communication terminal 2 acquires a first message from an AllJoyn device of the smart home system 1.

The AllJoyn devices of the smart home system 1 may include a video surveillance camera 3, a smoke detector 4, a burglar alarm 5 and a gas leak alarm 6. In other embodiments, the AllJoyn devices may also include other everyday household appliances such as lights and televisions. In addition, the communication terminal 2 can also be connected to community service facilities, enabling the communication between the smart home system 1 and the community. The communication terminal 2 may build up Wi-Fi connections with the video surveillance camera 3, the smoke detector 4, the burglar alarm 5 and the gas leak alarm 6, respectively. Alternatively, the connections can be replaced by Bluetooth connections or other wired or wireless connections. Typically, Wi-Fi connections are chosen, through which the communication terminal 2 can obtain the first message from the AllJoyn device. The method may proceed to step S23.

In the following step S23, the communication terminal 2 compares the first message against a preset message comparison table for a match, in order to acquire a second message matching the first message.

Figure 8:
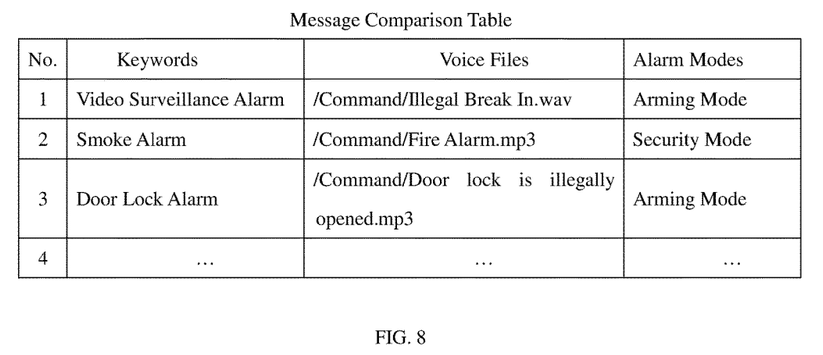
FIG. 8 shows a message comparison table according to the disclosure.

The communication terminal 2 may create a message comparison table and store it into the storage module 13. The message comparison table can be, for example, as shown in FIG. 8, and it may include keywords, alarms modes and voice files.

The communication terminal 2 can autonomously record voice contents relying on its learning capacity. For example, when the home telephone is in the learning mode, it can record the text messages, reported by other AllJoyn devices through message notification, as the keywords for reporting, and thus create the message comparison table; or, the user can manipulate on the interface displaying the message comparison table to enter keywords manually. The keywords are restricted by the languages supported by the communication terminal 2. Specifically, a keyword can be accepted only when the language of the keyword is supported by the communication terminal 2.

The processing module 11 of the communication terminal 2 may extract a keyword from the first message that is reported by another AllJoyn device through message notification, compare this keyword against the message comparison table saved in the storage module 13, and, when a match is found, acquire the second message matching the first message. For example, the communication terminal 2 may select the voice file, for example, a Way or MP3 file, corresponding to the keyword extracted from the first message. The user may previously store the voice files into the file system of the communication terminal 2 by way of recording or copying audio files. The method may further proceed to step S24.

In the following step S24, the communication terminal 2 transmits the second message by a preset mode.

The second message may be transmitted to the preset numbers as a short text message, and/or be conveyed to the preset numbers by way of voice by dialing the preset numbers. Referring also to FIG. 8, in the message comparison table each alarm mode corresponds to one keyword and one voice file. The processing module 11 may thus retrieve the alarm mode corresponding to the second message based on the keyword. The alarm modes may include arming mode, security mode, full dial-up mode, full short text message mode, full dial-up/short text message mode, etc. The communication module 12 may then transmit the second message in accordance with this alarm mode.

Figure 9:
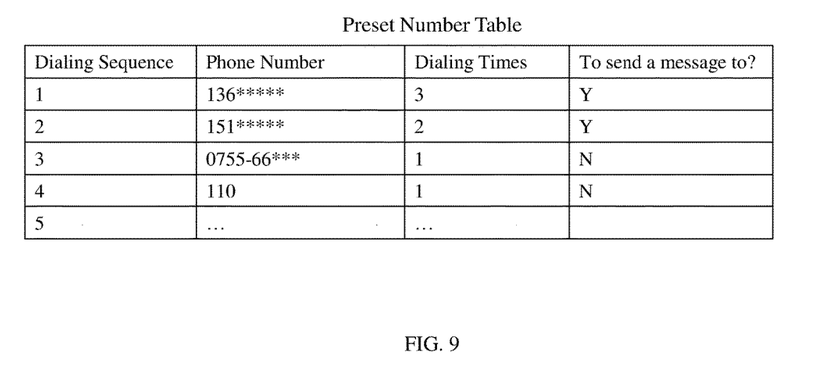
FIG. 9 shows a preset number table.

Under different alarm modes, the communication terminal 2 can issue the alarm by different means. In the arming mode, for example, the communication terminal 2, which is the smart home telephone, may report the message in accordance with the corresponding security level by dial-up; in the full dial-up/short text message mode, the smart home telephone may dial all the numbers and send messages to all the numbers. In the current embodiment, the storage module 13 may further be stored with a preset number table, as is shown in FIG. 9. The preset numbers can be configured based on requirements, for examples, cell phone numbers of home users, some external phone numbers, for example, the phone numbers of the most familiar relatives or friends, the police call 110, the fire emergency number 119, the community property management number, and so on. The number table can be sorted by priority, and each number can be configured with corresponding call times and/or a call time threshold, and can be further configured with whether to send a message thereto. For example, in the security mode, the smoke detector 4 and the gas leak alarm 6 would enter the monitoring state, if the smart home telephone acquires an alarm message from the gas leak alarm 6, it indicates there is a gas leak in the house, and the smart home telephone will immediately dial the preset user number to alert the user; if the preset call times are used up and the user still doesn't answer the phone, it may indicate the user is not available at the moment, then the smart home telephone will immediately dial the preset fire emergency number to inform by voice the firefighters the specific address of the gas leak, in case the user misses the message. Meanwhile, the smart home telephone may also notify the user by short text message. In other embodiments, the preset numbers are sorted by priority. The preset number may be dialed until the call is answered; or, all the preset numbers may be dialed until the call is answered; or, the preset number may be dialed within the preset time threshold. If the preset call times are used up and the call is still not answered, a short text message will be sent to the preset numbers. For example, if the call to the first (the most important) number is not answered, then the second number will be called, and so forth, until the call is answered; or, when the call to the first number is not answered, a short text message will be immediately sent to all the preset cellphone numbers. Typically, only cellphone numbers can receive short text messages, thus, a command as to whether to send a short text message is configured behind the corresponding number in the preset number table. The command behind a cellphone number is Y(yes), meaning a short text message can be sent to this number, and the command behind a fixed-line telephone number or an alarm number is N(no), meaning a short text message cannot be sent thereto and the second message can be conveyed only by voice.

In conclusion, the communication terminal 2 can acquire in real time a message from an AllJoyn device in the smart home system 1, compare the message with the preset messages for a match, and further report the matched message by the preset mode, such that the user can achieve a realtime control over the smart home system 1 via the communication terminal 2. Furthermore, the smart home system 1 provides a low cost because it can enable realtime communication relying merely on software applications. In addition, the smart home system provides a wide coverage area, since it can provide the interconnection and intercommunication among the appliances in the home system 1, and also with the external devices.

Figure 10:
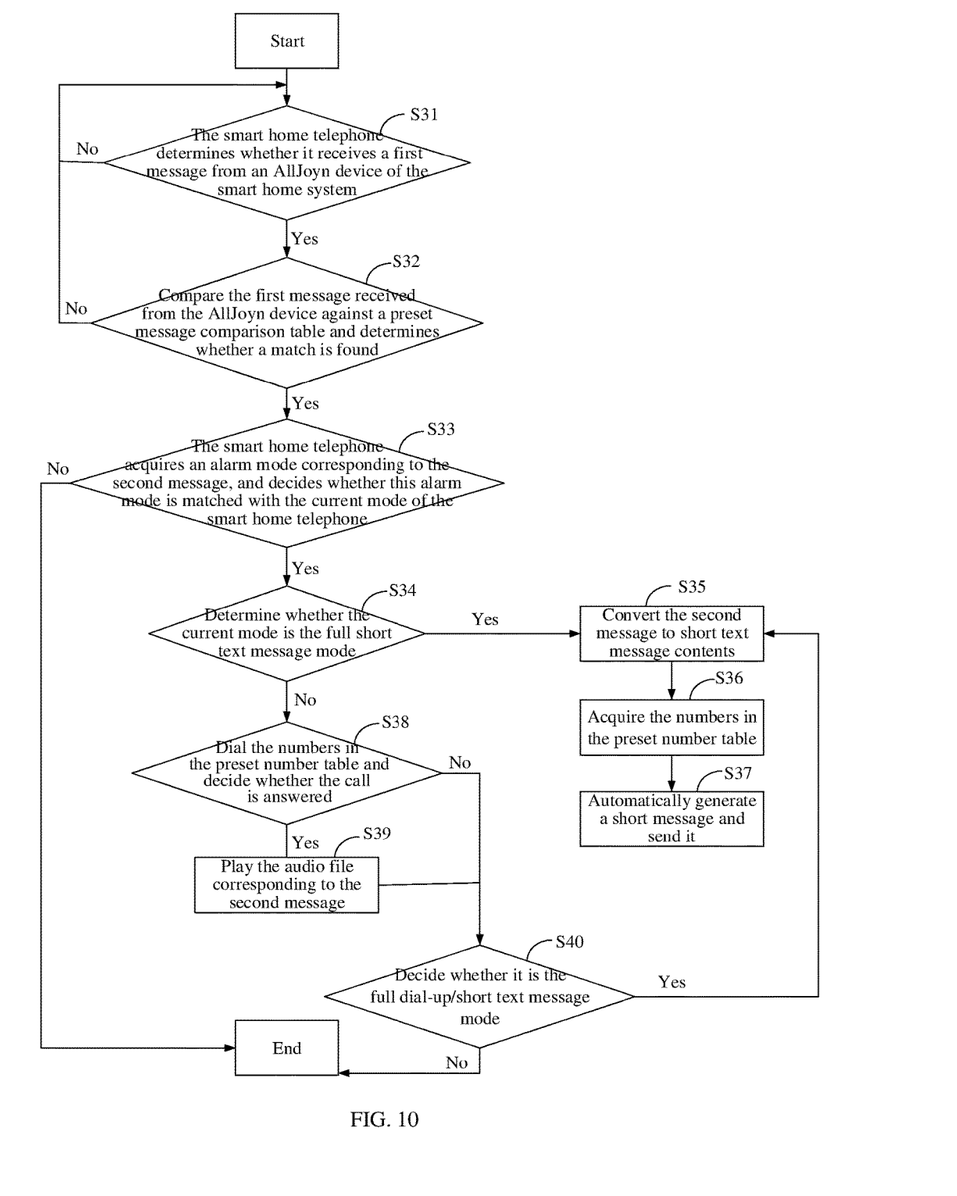
FIG. 10 is a flow chart illustrating a second embodiment of an application method of a communication terminal according to the disclosure.

Referring now to FIG. 10, a flow chart of an application method of a communication terminal according to another embodiment is shown. The application method is based on the embodiment shown in FIG. 7. The communication terminal 2 in this embodiment is a smart home telephone. The application method includes the following steps.

In a first step S31, the smart home telephone determines whether it receives a first message from an AllJoyn device of the smart home system 1.

The smart home telephone may be installed with AllJoyn application protocols and thus may have AllJoyn application features. If the processing module 11 determines that the first message is received from the AllJoyn device that is connected to the smart home telephone, turn to step S32; if not, the smart home telephone stays at the monitoring state to listen whether a first message is received from the AllJoyn device. The method may proceed to step S32.

In the following step S32, the first message received from the AllJoyn device is compared against a preset message comparison table, and it is further determined whether a match is found.

The processing module 11 of the smart home telephone may extract a keyword from the acquired first message and compare the keyword against the preset message comparison table. If a match is found, the processing module 11 will acquire a second message matching the first message, and step S33 is entered to initiate the message reporting. The second message can be a voice file or a short text message, and can also be a video file or other data files.

If a match is not found, the currently received message will be ignored, and the smart home telephone will hold the monitoring state. For example, if the video surveillance camera 3 detects that a person enters the house, but further decides that the person is the user's family, then the smart home telephone determines that the message acquired from the video surveillance camera 3 is not qualified as an alarm message, and thus will directly neglect this message and continue to maintain the monitoring state. The method may further proceed to step S33.

In the following step S33, the smart home telephone retrieves the alarm mode corresponding to the second message, and determines whether this alarm mode matches with the current mode of the smart home telephone.

In the message comparison table, each keyword corresponds to one second message and one alarm mode, thus the first message can be transformed to the second message based on the keyword extracted from the first message, and an alarm mode corresponding to the second message can be further retrieved. The smart home telephone may further acquire its current mode, and compare the alarm mode with the current mode, if they match with each other, turn to step S34; if not, end. By the matching operation of step S33, the operation of the smart home telephone can be optimized. For example, when the user returns home, he can manually switch the smart home telephone to the current mode, such as the conventional telephone mode including only answering and calling functions, in order to save energy. If the user is out and nobody is home, the smart home telephone can be switched to the arming mode or security mode to achieve a smart home control. The method may further proceed to step S34.

In the following step S34, it is determined that whether the current mode is the full short text message mode.

After the alarm mode corresponding to the second message is determined to be matching with the current mode in step S33, it is further determined whether the current mode is the full short text message mode, if yes, enter the full short text message mode, which includes steps S35, S36 and S37; if not, enter the full dial-up mode, which includes steps S38 and S39.

The flow of the full short text message mode may include the following steps.

In the first step S35, the second message is converted to short text message contents.

When the current mode is the full short text message mode, if the second message is of the short text message format, it needs not be converted and can be directly edited; if the second message is a voice file or a video file, it will be converted to the corresponding short text message contents and edited accordingly.

In the following step S36, the numbers in the preset number table are acquired.

The storage module 13 of the smart home telephone may be stored with a preset number table, which may include different numbers configured as needed. The processing module 11 may acquire from the number table all the numbers to which messages need to be sent. Alternatively, only several numbers may be selected from the number table as the numbers to which messages are sent, in order to save energy, in which case the messages will only be sent to the designated numbers.

In the following step S37, a message is automatically generated and transmitted.

The short text message contents may be used to generate a short text message and thus transmitted to the preset numbers or designated numbers in the number table.

The flow of the full dial-up mode may include the following steps.

In the first step S38, the numbers in the preset number table will be dialed and it is determined whether the call is answered.

When the current mode is not the short text message mode, the numbers in the preset number table will be acquired. The numbers in the preset number table may be sorted by priority. Each number in the number table may further be configured with corresponding call times, if all the call times are used up and the call is still not answered, the flow will end. In addition, a call time threshold can further be configured, and the smart home telephone will dial the numbers in the number table within the call time threshold.

In the following step S39 of the flow, the audio file corresponding to the second message is played.

If the call to the dialed number is answered, the second message will be converted to the corresponding audio file and thus be played. This audio file may be continuously and repeatedly played, until the call is hung up. Or, the playing times can be configured in advance, which means the audio file will be played continuously for the preset playing times, until the call is hung up by the user manually or the preset playing times are used up. In addition, the playing time period can be configured, which indicates that the audio file will be played within the time period.

Furthermore, when the current mode is the non-short text message mode, it may further include a full dial-up mode/short text message mode. In step S38, if the call to the dialed number is not answered, turn to step S40; or when the user answers the call in step S39, turn to the step S40.

In the following step S40 of the flow, it is determined whether the current mode is the full dial-up/short text message mode, if yes, again enter the step S35 and convert the second message to the corresponding short text message contents and transmit the short text message in accordance with the steps of the short text message mode; if not, end.

Below an application scenario is raised to illustrate this embodiment. For example, the current smart home system 1 activates the arming mode, which refers to the mode of message reporting in accordance with the corresponding security levels, thus, with respect to different security levels, the dialed numbers may be the same or different. When a thief breaks the house by illegally prying the door lock, the burglar alarm 5 mounted on the door will give an alarm, where the burglar alarm 5 may be configured as the bell ringing mode in order to scare off the thief, and the smart home telephone will acquire the alarm message from the burglar alarm 5 and dial the preset number in the number table to notify the user that some person illegally breaks the house such that the user may call the police; if the smart home telephone dial the user number for the preset times and still get no answer, it will call the public security organization or local police station by the preset alarm calls, so as to guarantee the safety of the user's home, and the thief will be arrested by the coming police. In addition, the video surveillance camera 3 can record the thief's appearance information.

If the smart home telephone acquires the fire alarm from the smoke detector, it will notify the user by call. The smart home telephone can be configured to continuously make the call until the user answers the call, such that he can take measures at first time, in case of missing the opportunity due to delay.

In conclusion, the communication terminal according to the disclosure is installed with AllJoyn application protocols, and is applied to the smart home system based on AllJoyn application protocols. The communication terminal acquires a first message from an AllJoyn device of the smart home system, compares the first message against the preset message comparison table for a match and thus retrieves a second message matching the first message, and sends the second message by the preset mode, such that smart home telephone can be connected to the AllJoyn devices of the smart home system based on AllJoyn application protocols, enabling the smart home system relying on the communication terminal. In addition, the smart home system enabled by software applications provides a low cost, a wide coverage area and a high intelligence.

Furthermore, it is apparent to those skilled in the art that, the present disclosure also provides a smart home system based on a communication terminal, which comprises a non-transitory program storage medium and a processor. The non-transitory program storage medium stores a program executed by the processor to perform the methods as described above. Furthermore, it is apparent to those skilled in the art that, various units or modules 11, 12 and 13 as shown in FIG. 3 are software modules or software units. In another aspect, it is well-known that various software modules or software units are inherently stored in the non-transitory program storage medium and executed by the processor.

The above embodiments are described with reference to the accompanying drawings, which are merely illustrative but not to limit the scope of the disclosure. Any modifications, equivalent substitutions and improvements made, by those of skill in the art, without departing from the scope and spirits of the disclosure, shall all be covered within the scope of the disclosure.

The invention claimed:

1. An application method of a communication terminal, wherein the communication terminal is applied to a smart home system based on internet of things (IoT) protocols, the application method comprising:
    installing, by the communication terminal, the IoT protocols, wherein the IoT protocols are AllJoyn application protocols, and the communication terminal acquires an AllJoyn software development kit (SDK) to install the AllJoyn SDK;
    acquiring, by the communication terminal, a first message from a device of the smart home system, wherein the communication terminal and the device of the smart home system are positioned in home; the communication terminal and the device are connected to each other without a server, to acquire the first message from the device, which is an AllJoyn device;
    comparing the first message against a preset message comparison table for a match and thus acquiring a second message matching the first message, wherein a keyword is extracted from the first message and is compared against the preset message comparison table, and, when a match is found, the second message matching the first message is acquired from the preset message comparison table; and
    transmitting the second message to at least one remote mobile terminal outside the home by a preset mode, such that the at least one remote mobile terminal is capable of reading a status of the device of the smart home system via the communication terminal;
    wherein the transmitting the second message to at least one remote mobile terminal corresponding to at least one preset number and outside the home by the preset mode comprises:
    acquiring, by the communication terminal, an alarm mode corresponding to the second message based on the keyword; and
    transmitting the second message in accordance with the alarm mode;
    wherein transmitting the second message in accordance with the alarm mode further comprises:
    determining, by the communication terminal, whether the alarm mode matches with a current mode of the communication terminal;
    based on the determination that the alarm mode matches with the current mode, determining whether the current mode is the full short text message mode;
    based on the determination that the current mode is the full short text message mode, converting the second message to short text message content, acquiring the numbers in a preset number table, automatically generating a short text message by using the short text message content, and transmitting the short text message to the at least one remote mobile terminal corresponding to the at least one preset number.

2. The application method according to claim 1, wherein the transmitting the second message in accordance with the alarm mode comprises at least one of:
    sending the second message to at least one preset number by way of short text message; and
    dialing at least one preset number to convey the second message by way of voice.

3. The application method according to claim 2, wherein the dialing the at least one preset number comprises one of:
    continuously dialing the at least one preset number until answered; and
    dialing all the preset numbers until answered.

4. The application method according to claim 1, wherein the communication terminal comprises a smart home telephone; and the AllJoyn device comprises at least one of a video surveillance camera, a smoke detector, a burglar alarm, and a gas leak alarm.

5. The application method according to claim 1, further comprising:
    connecting, by the communication terminal, to an external community service facility;
    receiving, by the communication terminal, a third message from the community service facility; and
    sending, by the communication terminal, the third message to the at least one remote mobile terminal corresponding to the at least one preset number by a preset mode.

6. The application method according to claim 1, based on the determination that the current mode is not the full short text message mode, further comprising:
    dialing the numbers in the preset number table and determining whether the call is answered;
    based on the determination that the call is answered, converting the second message to a corresponding audio file and playing the audio file; and
    based on the determination that the call is not answered or after the audio file is played, determining whether the current mode is the full dial-up/short text message mode;
    based on the determination that the current mode is the full dial-up/short text message mode, converting the second message to the short text message content, acquiring the numbers in a preset number table, automatically generating a short text message by using the short text message content, and transmitting the short text message to the at least one remote mobile terminal corresponding to the at least one preset number.

7. The application method according to claim 1, wherein the first message is an alarm message;
the second message is a voice file, a video file or a short text message corresponding to the keyword extracted from the first message and configured to indicate the status of the device of the smart home system.

8. An application method of a communication terminal, wherein the communication terminal is applied to a smart home system based on internet of things (IoT) protocols, comprising:
installing, by the communication terminal, the IoT protocols;
acquiring, by the communication terminal, a first message from a device of the smart home system; wherein the communication terminal and the device of the smart home system are positioned in home; the communication terminal and the device of the smart home system are connected to each other without a server;
comparing the first message against a preset message comparison table for a match and thus acquiring a second message matching the first message; and
transmitting the second message to at least one remote mobile terminal outside the home by a preset mode, such that the at least one remote mobile terminal is capable of reading a status of the device of the smart home system via the communication terminal;
wherein the transmitting the second message by the preset mode comprises:
acquiring an alarm mode corresponding to the second message based on a keyword extracted from the first message; and
transmitting the second message in accordance with the alarm mode;
wherein transmitting the second message in accordance with the alarm mode further comprises:
determining, by the communication terminal, whether the alarm mode matches with a current mode of the communication terminal;
based on the determination that the alarm mode matches with the current mode, determining whether the current mode is the full short text message mode;
based on the determination that the current mode is the full short text message mode, converting the second message to short text message content, acquiring the numbers in a preset number table, automatically generating a short text message by using the short text message content, and transmitting the short text message to the at least one remote mobile terminal corresponding to the at least one preset number.

9. The application method according to claim 8, wherein the IoT protocols are AllJoyn application protocols, and the communication terminal installing the IoT protocols comprises:
acquiring, by the communication terminal, an AllJoyn software development kit (SDK) to install the AllJoyn application protocols; and
the communication terminal acquiring the first message from the device of the smart home system comprises:
establishing, by the communication terminal, a connection with the device to acquire the first message from the device, which is an AllJoyn device.

10. The application method according to claim 8, wherein comparing the first message against the preset message comparison table for a match comprises:
extracting the keyword from the first message, comparing the keyword against the preset message comparison table, and, when a match is found, acquiring the second message matching the first message from the preset message comparison table.

11. The application method according to claim 8, wherein the transmitting the second message in accordance with the alarm mode comprises at least one of:
sending the second message to at least one preset number by way of short text message; and
dialing at least one preset number to send the second message be way of voice.

12. The application method according to claim 11, wherein the dialing the at least preset number comprises one of:
continuously dialing the at least one preset number until answered; and
dialing all the preset numbers until answered.

13. The application method according to claim 8, based on the determination that the current mode is not the full short text message mode, further comprising:
dialing the numbers in the preset number table and determining whether the call is answered;
based on the determination that the call is answered, converting the second message to a corresponding audio file and playing the audio file; and
based on the determination that the call is not answered or after the audio file is played, determining whether the current mode is the full dial-up/short text message mode;
based on the determination that the current mode is the full dial-up/short text message mode, converting the second message to the short text message content, acquiring the numbers in a preset number table, automatically generating a short text message by using the short text message content, and transmitting the short text message to the at least one remote mobile terminal corresponding to the at least one preset number.

14. A smart home system comprising a communication terminal, wherein the communication terminal is applied to the smart home system based on internet of things (IoT) protocols, and comprises a processor and a non-transitory program storage module, the non-transitory program storage module comprising:
a processing module configured to install the IoT protocols; and
a communication module connected to the processing module and configured to acquire a first message from a device of the smart home system, wherein the communication terminal and the device of the smart home system are positioned in home; and
wherein the processing module compares the first message against a preset message comparison table for a match and thus acquires a second message matching the first message, and the communication module sends the second message to at least one remote mobile terminal outside the home by a preset mode, such that the at least one remote mobile terminal is capable of reading a status of the device of the smart home system via the communication terminal;
the storage module further contains alarm modes corresponding to the message comparison table, the processing module acquires the alarm mode corresponding to the second message based on a keyword extracted from the first message, and the communication module transmits the second message in accordance with the alarm mode;

wherein the processor is further configured to:
determine whether the alarm mode matches with a current mode of the communication terminal;
based on the determination that the alarm mode matches with the current mode, determine whether the current mode is the full short text message mode; and
based on the determination that the current mode is the full short text message mode, convert the second message to short text message content, acquire the numbers in a preset number table, automatically generate a short text message by using the short text message content, and transmit the short text message to the at least one remote mobile terminal corresponding to the at least one preset number.

15. The smart home system according to claim 14, wherein the IoT protocols are AllJoyn application protocols, the communication module acquires an AllJoyn software development kit (SDK), and the processing module installs the AllJoyn SDK to implant the AllJoyn application protocols; the communication module establishes a connection with the device to acquire the first message from the device, which is an AllJoyn device.

16. The smart home system according to claim 15, wherein the communication terminal further comprises a storage module connected to the processing module and configured to store the message comparison table; the processing module extracts a keyword from the first message, and compares the keyword against the message comparison table, and, when a match is found, acquires the second message matching the first message from the message comparison table.

17. The smart home system according to claim 14, wherein the processor is further configured to:
dial the numbers in the preset number table and determining whether the call is answered;
based on the determination that the call is answered, convert the second message to a corresponding audio file and play the audio file; and
based on the determination that the call is not answered or after the audio file is played, determine whether the current mode is the full dial-up/short text message mode;
based on the determination that the current mode is the full dial-up/short text message mode, convert the second message to the short text message content, acquire the numbers in a preset number table, automatically generate a short text message by using the short text message content, and transmit the short text message to the at least one remote mobile terminal corresponding to the at least one preset number.

\* \* \* \* \*